US007696965B2

(12) United States Patent
Cok

(10) Patent No.: US 7,696,965 B2
(45) Date of Patent: Apr. 13, 2010

(54) METHOD AND APPARATUS FOR COMPENSATING AGING OF OLED DISPLAY

(75) Inventor: Ronald S. Cok, Rochester, NY (US)

(73) Assignee: Global OLED Technology LLC, Wilmington, DE (US)

( * ) Notice: Subject to any disclaimer, the term of this patent is extended or adjusted under 35 U.S.C. 154(b) by 971 days.

(21) Appl. No.: 11/424,568

(22) Filed: Jun. 16, 2006

(65) Prior Publication Data

US 2007/0290957 A1 Dec. 20, 2007

(51) Int. Cl.
*G01J 1/42* (2006.01)
*G09G 3/10* (2006.01)

(52) U.S. Cl. ............................ 345/82; 345/83; 345/30; 345/55; 345/204; 345/76; 250/552; 340/815.45; 315/169.3

(58) Field of Classification Search .................. 345/82, 345/30, 55, 39, 44; 250/552; 340/815.45, 340/282
See application file for complete search history.

(56) References Cited

U.S. PATENT DOCUMENTS

| | | | | |
|---|---|---|---|---|
| 6,081,073 | A | 6/2000 | Salam | |
| 6,473,065 | B1 | 10/2002 | Fan | |
| 6,501,230 | B1 * | 12/2002 | Feldman | 315/169.3 |
| 6,995,519 | B2 | 2/2006 | Arnold et al. | |
| 2002/0101395 | A1 * | 8/2002 | Inukai | 345/83 |
| 2004/0001037 | A1 | 1/2004 | Tsujimura et al. | |
| 2004/0032382 | A1 | 2/2004 | Cok et al. | |
| 2004/0150590 | A1 * | 8/2004 | Cok et al. | 345/76 |
| 2004/0263445 | A1 * | 12/2004 | Inukai et al. | 345/82 |
| 2005/0024352 | A1 | 2/2005 | Sano | |
| 2005/0180083 | A1 | 8/2005 | Takahara et al. | |

(Continued)

FOREIGN PATENT DOCUMENTS

WO WO 2005/015530 2/2005

(Continued)

OTHER PUBLICATIONS

U.S. Appl. No. 11/093,115, filed Mar. 29, 2005; titled "Method And Apparatus For Uniformity And Brightness Correction In An OLED Display"; of Ronald S. Cok and James H. Ford.

(Continued)

*Primary Examiner*—Richard Hjerpe
*Assistant Examiner*—Olga Merkoulova
(74) *Attorney, Agent, or Firm*—Morgan Lewis & Bockius LLP

(57) ABSTRACT

A method of compensating an OLED display device having light-emitting elements that change with use, comprising the steps of: a) using the device to display images; b) sequentially displaying an ordered series of calibration images, wherein each of the calibration images have one or more corresponding flat fields, at least one of the corresponding flat fields of each calibration image of the ordered series has a different luminance value, and the calibration images are arranged in the ordered series so as to reduce perceived luminance discontinuities; c) measuring and recording current used by the display for each sequentially displayed calibration image; d) calculating compensation parameters based on the measured currents; e) compensating an input image using the compensation parameters; and f) displaying the compensated input image.

14 Claims, 2 Drawing Sheets

U.S. PATENT DOCUMENTS

| | | | |
|---|---|---|---|
| 2005/0269959 | A1 | 12/2005 | Uchino et al. |
| 2006/0007249 | A1 | 1/2006 | Reddy et al. |
| 2006/0203125 | A1* | 9/2006 | Sayre ......................... 348/459 |

FOREIGN PATENT DOCUMENTS

| | | |
|---|---|---|
| WO | WO 2005/057544 | 6/2005 |
| WO | WO 2006/012028 | 2/2006 |
| WO | WO 2006/046196 | 5/2006 |

OTHER PUBLICATIONS

Shah M. Jahinuzzaman et al; "Threshold Voltage Instability Of Amorphous Silicon Thin-Film Transistors Under Constant Current Stress"; Applied Physics Letters; 87; 023502; 2005.

* cited by examiner

METHOD AND APPARATUS FOR COMPENSATING AGING OF OLED DISPLAY

FIELD OF THE INVENTION

The present invention relates to OLED display devices having light-emitting elements that change with use and, more particularly, compensating for changes in the OLED device during customer use.

BACKGROUND OF THE INVENTION

Flat-panel display devices, for example plasma, liquid crystal and Organic Light Emitting Diode (OLED) displays have been known for some years and are widely used in electronic devices to display information and images. Such devices employ both active-matrix and passive-matrix control schemes and can employ a plurality of light-emitting elements. The light-emitting elements are typically arranged in two-dimensional arrays with a row and a column address for each light-emitting element and having a data value associated with each light-emitting element to emit light at a brightness corresponding to the associated data value.

Active-matrix electroluminescent devices typically employ thin-film electronic components formed on the same substrate as the light-emitting elements thereof to control light emission from individual light-emitting elements thereof. Such thin film electronic components are subject to manufacturing process variabilities that may cause such components to have variable performance. In particular, the voltage at which thin-film transistors turn on ("threshold voltage") may vary. Low-temperature polysilicon (LTPS) devices have a short-range variability due to the variability in the silicon annealing process used to form such devices. Amorphous silicon devices typically have a long-range variability due to variabilities in the silicon deposition processes. Further, threshold voltage properties of such thin-film devices may changes significantly with use over time, particularly for amorphous silicon devices. Typical large-format displays, e.g., employ hydrogenated amorphous silicon thin-film transistors (aSi-TFTs) to drive the pixels in such large-format displays. However, as described in "Threshold voltage instability of amorphous silicon thin-film transistors under constant current stress" by Jahinuzzaman et al in Applied Physics Letters 87,023502 (2005), the aSi-TFTs exhibit a metastable shift in threshold voltage when subjected to prolonged gate bias. This shift is not significant in traditional display devices such as LCDs because the current required to switch the liquid crystals in LCD display is relatively small. However, for OLED applications, much larger currents must be switched by the aSi-TFT circuits to drive the organic materials to emit light. Thus, OLED displays employing aSi-TFT circuits are expected to exhibit a significant voltage threshold shift as they are used. This voltage shift may result in decreased dynamic range and image artifacts. Moreover, the organic materials in OLED devices also deteriorate in relation to the integrated current density passed through them over time so that their efficiency drops while their resistance to current increases.

One approach to avoiding the problem of voltage threshold shift in aSi-TFT circuits is to employ circuit designs whose performance is relatively constant in the presence of such voltage shifts. For example, US20050269959 A1 entitled "Pixel circuit, active matrix apparatus and display apparatus" describes a pixel circuit having a function of compensating for characteristic variation of an electro-optical element and threshold voltage variation of a transistor. The pixel circuit includes an electro-optical element, a holding capacitor, and five N-channel thin film transistors including a sampling transistor, a drive transistor, a switching transistor, and first and second detection transistors. Alternative circuit designs employ current-mirror driving circuits or voltage to current conversion circuits, that reduce susceptibility to transistor performance, e.g., US2005/0180083, US2005/0024352 and WO2006/012028. Other methods, such as taught in US20040032382, WO2005/015530, and WO2006/046196, employ photo-sensors in pixel-driving circuits and employ feedback control so that pixels emit a desired amount of light regardless of organic material or transistor performance. However, such designs typically require complex, larger and/or slower circuits than the two-transistor, single capacitor circuits otherwise employed, thereby increasing costs and reducing the area on a display available for emitting light and decreasing the display lifetime.

Other compensation methods are described in the prior art to mitigate the effects of changing organic material properties and changing thin-film transistor properties. One group of compensation methods attempts to prevent the problem from occurring, for example by employing reverse-biasing to undo thin-film circuit changes. For example, US20040001037 A1 entitled "Organic light-emitting diode display" describes a technique to reduce the rate of increase in threshold voltage, i.e. degradation, of an amorphous silicon TFT driving an OLED. A first supply voltage is supplied to a drain of the TFT when a first control voltage is applied to a gate of the TFT to activate the TFT and drive the OLED. However, a second, lower supply voltage is supplied to the drain of the TFT when a second control voltage is applied to the gate of the TFT to deactivate the TFT and turn off the OLED, whereby a voltage differential between the drain and the source when the second control voltage is applied to the gate is substantially lower said first supply voltage. This reduces degradation of the TFT. However, such schemes typically require complex additional circuitry and timing signals, thereby reducing the area on a display available for emitting light and decreasing the display lifetime and cost. Alternatively, by increasing the size of organic light-emitting elements or placing a maximum on the current that passes through the organic elements, degradation may be decreased. However, these methods have limited utility in that the degradation problem is not solved but rather reduced.

Other techniques employ external compensation to mitigate the effects of changes in the display device. For example, U.S. Pat. No. 6,995,519 describes an organic light emitting diode (OLED) display comprising an array of OLED display light-emitting elements, each OLED display light-emitting element having two terminals; a voltage sensing circuit for each OLED display light-emitting element in the display array including a transistor in each circuit connected to one of the terminals of a corresponding OLED display light-emitting element for sensing the voltage across the OLED display light-emitting element to produce feedback signals representing the voltage across the OLED display light-emitting elements in the display array; and a controller responsive to the feedback signals for calculating a correction signal for each OLED display light-emitting element and applying the correction signal to data used to drive each OLED display light-emitting element to compensate for the changes in the output of each OLED display light-emitting element. However, this design also suffers from the need for additional circuitry in each active-matrix pixel.

It is known in the prior art to measure the performance of each pixel in a display and then to correct for the performance of the pixel to provide a more uniform output across the display. U.S. Pat. No. 6,081,073 entitled "Matrix Display with Matched Solid-State Pixels" by Salam granted Jun. 27, 2000 describes a display matrix with a process and control means for reducing brightness variations in the pixels. This patent describes the use of a linear scaling method for each pixel based on a ratio between the brightness of the weakest pixel in the display and the brightness of each pixel. However, this approach will lead to an overall reduction in the dynamic range and brightness of the display and a reduction and variation in the bit depth at which the pixels can be operated.

U.S. Pat. No. 6,473,065 B1 entitled "Methods of improving display uniformity of organic light emitting displays by calibrating individual pixel" by Fan issued 20021029 describes methods of improving the display uniformity of an OLED. In order to improve the display uniformity of an OLED, the display characteristics of all organic-light-emitting-elements are measured, and calibration parameters for each organic-light-emitting-element are obtained from the measured display characteristics of the corresponding organic-light-emitting-element. The calibration parameters of each organic-light-emitting-element are stored in a calibration memory. The technique uses a combination of look-up tables and calculation circuitry to implement uniformity correction. However, the described approaches require either a lookup table providing a complete characterization for each pixel, or extensive computational circuitry within a device controller. This is likely to be expensive and impractical in most applications.

Copending, commonly assigned U.S. Ser. No. 11/093,115 describes a method for the correction of average brightness or brightness uniformity variations in OLED displays wherein the brightness of each light-emitting element is measured at two or more, but fewer than all possible, different input signal values. While brightness or luminance measurements may be practical in a manufacturing environment, and thus appropriate for initial display calibration, they may be problematic after the display is subsequently put into use and thus less practical for performance of aging compensation.

US2006/0007249 discloses a method for operating and individually controlling the luminance of each pixel in an emissive active-matrix display device including storing transformation between digital image gray level value and display drive signal that generates luminance from pixel corresponding to digital gray level value; identifying target gray level value for particular pixel; generating display drive signal corresponding to identified target gray level based on stored transformation and driving particular pixel with drive signal during first display frame; measuring parameter representative of actual measured luminance of particular pixel at a second time after the first time; determining difference between identified target luminance and actual measured luminance; modifying stored transformation for particular pixel based on determined difference; and storing and using modified transformation for generating display drive signal for particular pixel during frame time following first frame time.

WO 2005/057544 describes a video data signal correction system for video data signals addressing active matrix electroluminescent display devices wherein an updated electrical characteristic parameter X is calculated for each drive transistor by measuring actual current through a power line in comparison to expected current determined using a model and a previously stored parameter value, where subsequent video data signals are corrected in accordance with the calculated parameter X. Calculation of characteristic parameters based on assumed pre-determined performance relationships, however, may require consideration of many parameters having complex interactive relationships, and further may not accurately reflect actual device performance.

US 2004/0150590 describes an OLED display comprising a plurality of light emitting elements divided into two or more groups, the light emitting elements having an output that changes with time or use; a current measuring device for sensing the total current used by the display to produce a current signal; and a controller for simultaneously activating all of the light emitting elements in a group and responsive to the current signal for calculating a correction signal for the light emitting elements in the group and applying the correction signal to input image signals to produce corrected input image signals that compensate for the changes in the output of the light emitting elements of the group. While this technique is useful and effective, the problem of measuring the currents while the display is in use without causing the user to perceive luminance discontinuities, or other objectionable display artifacts necessary for performing the measurements, remains.

There is a need, therefore, for an improved method of measuring and compensating for changes in the performance of light-emitting elements in an OLED display device.

SUMMARY OF THE INVENTION

In accordance with one embodiment, the present invention is directed towards a method of compensating an OLED display device having light-emitting elements that change with use, comprising the steps of: a) using the device to display images; b) sequentially displaying an ordered series of calibration images, wherein each of the calibration images have one or more corresponding flat fields, at least one of the corresponding flat fields of each calibration image of the ordered series has a different luminance value, and the calibration images are arranged in the ordered series so as to reduce perceived luminance discontinuities; c) measuring and recording current used by the display for each sequentially displayed calibration image; d) calculating compensation parameters based on the measured currents; e) compensating an input image using the compensation parameters; and f) displaying the compensated input image.

ADVANTAGES

In accordance with various embodiments, the present invention may provide the advantage of improved uniformity and quality in a display and reduced costs, without causing a user to perceive objectionable luminance discontinuities when making performance measurements.

DETAILED DESCRIPTION OF THE INVENTION

Figure 1:
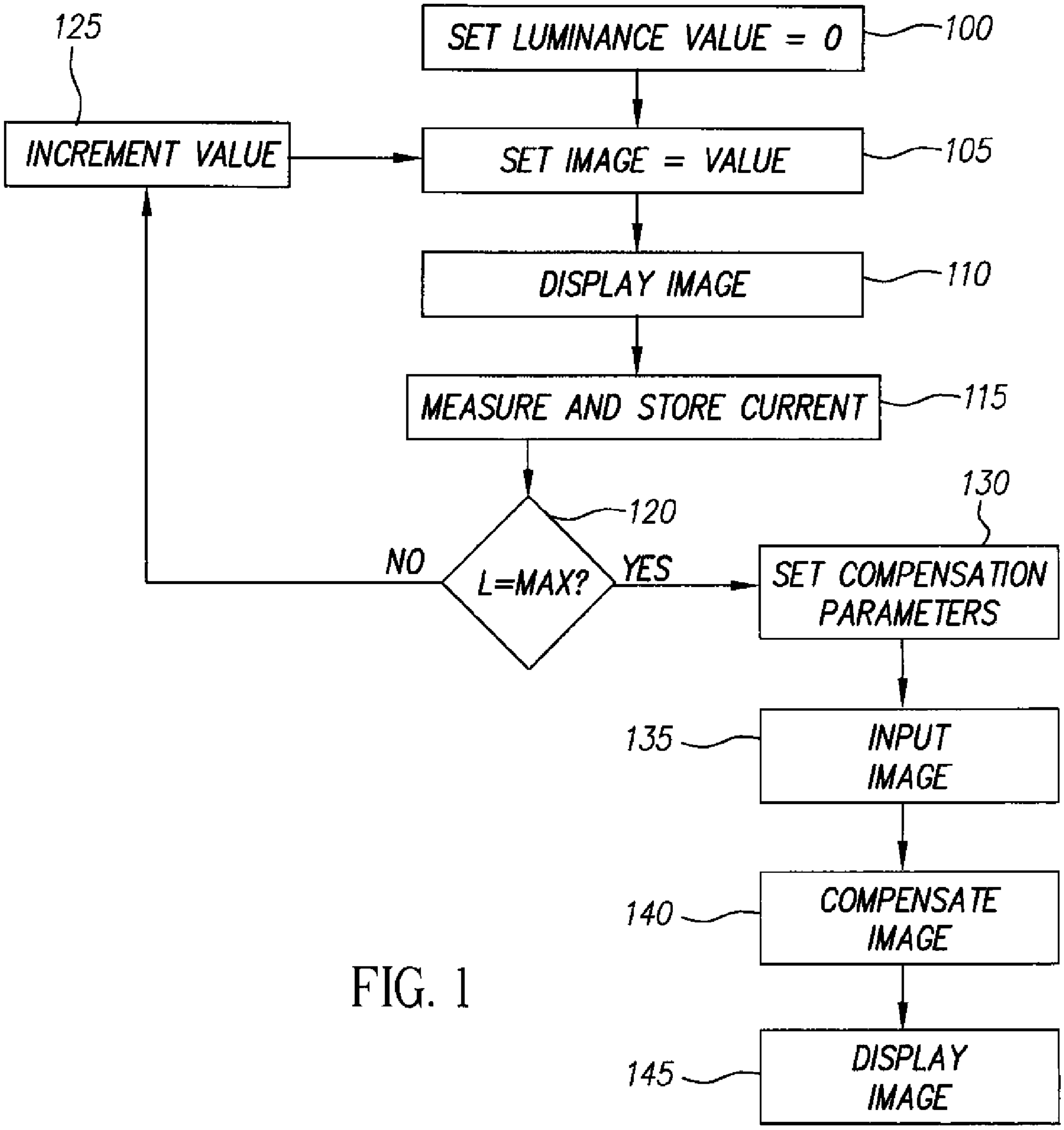
FIG. 1 is a flow diagram according to one embodiment of the present invention.

Referring to FIG. 1, according to one specific embodiment of the present invention, a luminance value is set 100 to zero and every pixel of a flat-field calibration image set 105 to the luminance value. The calibration image is displayed 110 and the current required to drive the display measured and stored 115. The luminance value is tested 120 to determine whether it is equal to a pre-determined maximum value. If it is not equal to the maximum luminance value, the image value is incremented 125, the image is set 105 to the image value, the calibration image is displayed 110, and the current measured 115 at the new image value. The process repeats until the luminance value is equal to the pre-determined maximum value. The stored current measurement values are then employed to set 130 compensation parameters and the calibration process is complete. An image is then input 135, compensated 140, and displayed 145. The series of calibration images may include flat fields having minimum and maximum display luminance values. Techniques for measuring current and developing compensation parameters are described in US 2004/0150590 referenced above, the disclosure of which is hereby incorporated by reference herein.

The iterative cycle of setting the calibration image to a monotonically increasing sequence of values essentially creates a temporal gray scale of calibration images from dark to light that are displayed and whose currents are measured. In this case, a viewer of the display will perceive the display going from a dark image to a bright image, thus reducing perceived luminance discontinuities during display of the calibration images. For example, an ordered series of calibration images may first display a calibration image having a flat field with a code value of 0, then a calibration image having a flat field with a code value of 1, then 2, and so forth until a calibration image having a flat field with a code value of 255 (for an 8-bit input signal) is displayed. In this case, the calibration images are arranged in the ordered series such that the corresponding flat fields of each calibration image sequentially increase in luminance value from smallest to largest, and the ordered series is preferably displayed at display power-up. In an alternative embodiment, the values may be monotonically iterated from the pre-determined maximum value and decremented to a minimum value, for example zero. In this second case, a viewer of the display will perceive the display going from a bright image to a dark calibration image. For example, an ordered series of calibration images may first display a calibration image having a flat field with a code value of 255 (for an 8-bit input signal), then a calibration image having a flat field with a code value of 254, then 253, and so forth until a calibration image having a flat field with a code value of 0 is displayed. In this alternative case, the calibration images are arranged in the ordered series such that the corresponding flat fields of each calibration image sequentially decrease in luminance value from largest to smallest, and the ordered series is preferably displayed at display power-down. In either case, the measurements are made without any intervening input signal values.

Because the display of the calibration images is visible to a user as its current performance is measured, it is helpful to perform the measurements at display start-up or shutdown to avoid obtrusion. In particular, it may be expected and acceptable by a viewer to view a screen going from dark to light after a display is first turned on and from light to dark after a display is turned off. Hence, it may be preferred to perform the calibration process from dark to light (as shown in FIG. 1) just after a display is turned on and before it is put into use. Moreover, at that time the display will likely be at ambient temperature, possibly reducing inaccuracies in measurement. Alternatively, it may be preferred to perform the calibration process from light to dark just after a display is turned off and before after it has been in use. At that time a user likely has no further interest in viewing the display and will not be forced to wait while the calibration process completes. Moreover, the device temperature may have stabilized at an operating temperature.

In an alternative embodiment of the present invention, calibration images may be arranged in pairs with a combined average luminance value. The combined average luminance values may then have a constant combined average luminance value. Alternatively, the combined average luminance values of the pairs may sequentially increase or sequentially decrease. For example, for a display device employing an 8-bit input signal, a calibration image having a flat field with a luminance code value of 0 is displayed, then a calibration image having a flat field with a luminance code value of 255, then a calibration image having a flat field with a luminance code value of 1, then a calibration image having a flat field with a luminance code value of 254, and so on until a calibration image having a flat field with a code value of 128 is displayed. Note that the pairs of calibration images (e.g. having a flat field having a luminance code value of 0 and a flat field having a luminance code value of 255) all have an average luminance code value of 128. Hence, if the calibration images are presented at a fast enough temporal rate, a viewer will perceive a constant gray luminance code value of 128. This approach corresponds to the first alternative. In a second example, for a display device employing an 8-bit input signal, a calibration image having a flat field with a luminance code value of 0 is displayed, then a calibration image having a flat field with a luminance code value of 128, then a calibration image having a flat field with a luminance code value of 1, then a calibration image having a flat field with a luminance code value of 129, and so on until a calibration image having a flat field with a code value of 127 followed by a flat field with a luminance code value of 255 is displayed. In this case, note that the average luminance code value of the pairs of calibration images increase from approximately 64 to 191. Hence, if the calibration images are presented at a fast enough temporal rate, a viewer will perceive a sequentially increasing gray luminance code value. In a third example, for a display device employing an 8-bit input signal, a calibration image having a flat field with a luminance code value of 127 is displayed, then a calibration image having a flat field with a luminance code value of 255, then a calibration image having a flat field with a luminance code value of 126, then a calibration image having a flat field with a luminance code value of 254, and so on until a calibration image having a flat field with a code value of 0 followed by a flat field with a luminance code value of 128 is displayed. In this case, note that the average luminance code value of the pairs of calibration images decreases from approximately 191 to 64. Hence, if the calibration images are presented at a fast enough temporal rate, a viewer will perceive a sequentially decreasing gray luminance code value. In general, calibration images with flat fields having alternating luminance code values may be grouped, and if displayed at a sufficiently high temporal rate, may provide a preferred order that has any desired changes in apparent luminance. Such methods are useful because they may reduce the total range of the displayed temporal gray scales, thereby decreasing their perceived luminance discontinuities by a user.

In a further embodiment of the present invention, the OLED devices are color devices having full-color pixels, each pixel having a plurality of differently-colored light-emitting elements, for example red, green, and blue or red, green, blue, and white. Because it is possible that the current characteristics of each of the colors may be different (because different organic materials may be employed to generate the differently colored light), it may be useful to measure the current employed by groups of light-emitting elements of a common color, i.e. it may be useful to measure the current employed by a red flat field, a green flat field, a blue flat field, and a white flat field (if a four-color system is employed). In this case, light-emitting elements comprise differently colored light-emitting elements, and ordered series of calibration images may be displayed for each of the different colors of light-emitting elements. In one embodiment of the present invention, a temporal "gray" scale of calibration images having colored flat fields may be first displayed in red, then in green, then in blue, and so on. However, the use of a series of increasing or decreasing color images is likely to be more objectionable than a single series of gray images. Hence, according to a further embodiment of the present invention, the ordered series of calibration images displayed for the different colors of light-emitting elements are arranged to sequentially display flat-fields of each color alternately at common luminance values. For example, a calibration image having a red flat field with a luminance value of 0 may be followed by a calibration image having a green flat field with a luminance value of 0 followed by a calibration image having a blue flat field with a luminance value of 0. Then a red flat field with a luminance value of 1 may be followed by a calibration image having a green flat field with a luminance value of 1 followed by a calibration image having a blue flat field with a luminance value of 1, and so forth. As noted above in the embodiment of alternating small and large luminance code values, if the calibration images having color flat fields with a common luminance value are displayed at a high enough temporal rate, a viewer will perceive a pleasing gray color.

In order to achieve a fast current measurement and to reduce flicker for alternating magnitude or color flat fields, in an alternative embodiment of the present invention, it may be useful to display images at a first frequency, and the calibration images are displayed at a second frequency different from the first frequency. For example, standard broadcast images may have a frequency of 30 frames per second. Since the calibration images are internally generated and displayed, they may be displayed at a much higher rate, for example 120 frames per second. The higher rates will reduce any flicker and will also have the virtue of reducing the calibration measurement time. Display controllers are well known in the art and circuitry capable of providing higher-rate frame displays may be constructed using known controller technology. If, on the other hand, the current measurement apparatus is relatively slow (for example to improve accuracy or to reduce costs), the calibration images may be displayed at a temporal frame rate slower than a conventional video signal, for example 15 frames per second. In any case, the method of the present invention will reduced the perceived luminance discontinuities of the display device when viewed by a user.

In a simple case, the calibration images employ a single flat field, that is, every light-emitting element of a common color in the flat field is the same. Such an approach allows a current measurement and detection of changes in the entire display. However, in an alternative embodiment, more than one image field may be employed in each calibration image. A first flat field may represent an area of particular interest and employ calibration images of the ordered series, each calibration image having a different luminance value in the flat field, and at least one other corresponding image area of each calibration image comprising a constant image that does not change from one calibration image to the next. The unchanging portion of the images will employ a constant current in the display and may thus be subtracted from the changing portion to obtain a measurement corresponding to the first flat field area only. This can be useful when the area corresponds to display locations having especially bright or unchanging signals resulting in differential burn-in of the display. Hence, in one embodiment of the present invention, every pixel in the OLED display device is driven at a series of different common values and the current used by all of the pixels together is measured.

In alternative embodiments, pixel sub-sets representing particular portions of the display may be assigned to the series of different common values and the remainder of the image to a second common value, for example zero. The corresponding flat field of each calibration image of the ordered series may be assigned, e.g., to particular portions or a group of light-emitting elements of the display defined by expected usage of the display. The particular portions may be chosen, e.g., to represent areas of an OLED expected to be subject to different usage, for example portions corresponding to the various signal formats (such as high-definition or standard-definition) as described, e.g., in US2006/0087588. In the extreme case, single pixels may be tested independently. By employing specific portions of interest, the behavior of the OLED display may be effectively measured. The remainder of the pixels not in a portion may be driven at a signal of zero so that no current contribution is made by these pixels to the current measurement. Alternatively, the remainder of the pixels in the portion may be driven at a common level chosen to optimize the accuracy of the current measurement and then discounted in the calculation of compensation parameters. For example, a current measurement apparatus may have improved accuracy at some current levels than at others.

In any of these embodiments, the series of calibration images may include a separate calibration image displaying a flat field having a luminance value corresponding to each of the display luminance values. In this case, a separate calibration image is provided for each possible display luminance output. Such an approach will provide a measurement, and calculated correction value, for every possible input signal. This thorough approach has the advantage of completeness and accuracy, but the drawback of requiring a longer time to perform. In an alternative embodiment of the present invention, the series of calibration images include fewer separate calibration images displaying flat field images having different luminance values than possible display luminance values. In this case, the compensation parameters corresponding to the missing display luminance values may be interpolated from the measured values. Methods for interpolating values are well known in the mathematical arts.

According to one embodiment of the present invention, the current used by the display may be measured at every level for which it is designed to operate, for example 256 for an 8-bit display, 1024 for a 10-bit display, or 4096 for a 12-bit display. Alternatively, the current used by the display may be measured at only a few levels for which it is designed to operate, for example 8, 16, 32, or 64 levels. These may, or may not, be regularly distributed over the range of acceptable input value. For example, a greater number of values may be employed near the expected threshold voltage so as to more accurately measure the threshold voltage. Moreover, only a few measurements, perhaps one or two, may be necessary to measure the current-voltage relationships for input voltages exceeding the threshold voltage. By reducing the number of input voltage levels measured, the time required to calibrate the display may be reduced. Moreover, fewer or more than 8 bits may be employed by a display, for example 10 or 12 bits. Furthermore, it is not essential to measure the current used by every brightness level at one time. For example, the display may have a number of different luminance values and the ordered series may include a first set of calibration images displayed at display power-up, and a second distinct set of calibration images displayed at display power-down, wherein each of the first and second sets of calibration images comprise corresponding flat fields having luminance values corresponding to less than all of the different display luminance values. Alternatively, one set of measurements may be made after or before the display is used and another set made after or before the display is used at another time. In either case, the first and second sets of calibration images may in combination comprise corresponding flat fields having luminance values corresponding to each of the different display luminance values. Hence, by employing such stratagems, the measurement of current used by the display can be made in a way that the user may find acceptable or imperceptible and perceived luminance discontinuities minimized.

Figure 2:
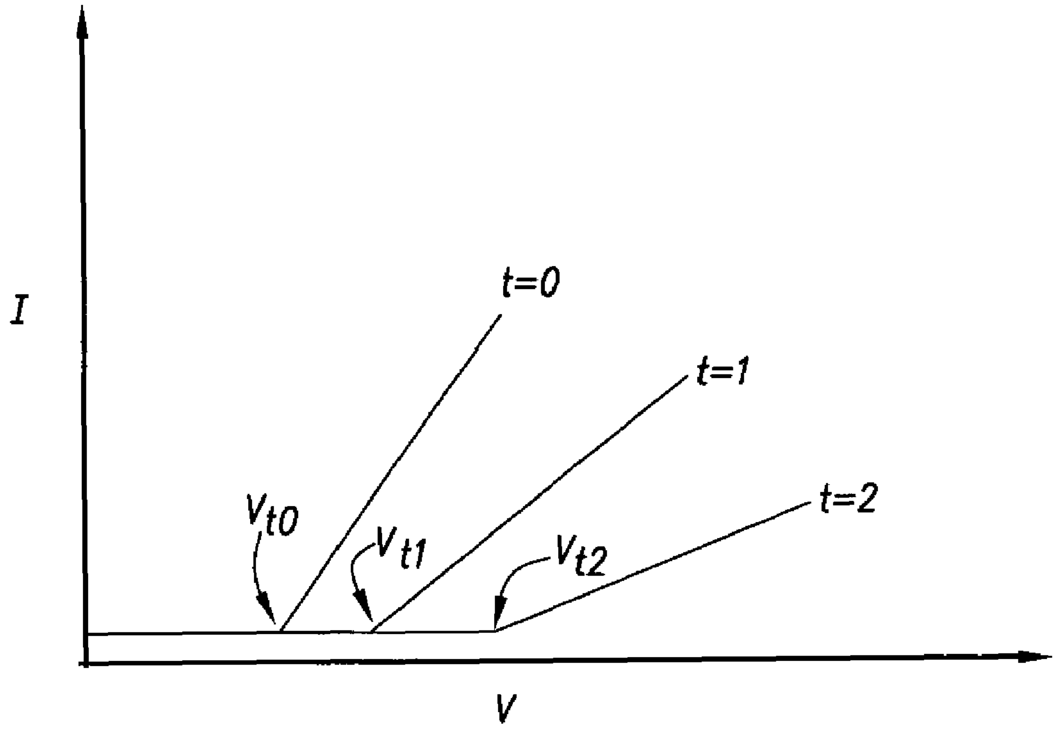
FIG. 2 is a graph illustrating the current-voltage relationship of an aSi-TFT OLED circuit over time.

Referring to FIG. 2, the current-voltage relationship of an OLED pixel over time is illustrated. At a first time $t_0$, each TFT will have a specific threshold voltage $V_{t0}$ specified by the silicon materials and manufacturing process. As the TFT is used, over time the threshold voltage will shift to a second point $V_{t1}$ at time $t_1$. Later, the threshold voltage may shift again to a third point $V_{t2}$ at time $t_2$. Moreover, because the current flow through the OLED materials themselves causes the materials to age and become more resistive, the slope of the current-voltage relationship will change so that at voltages exceeding the threshold voltage at a given time the current response to a given voltage will decrease. By measuring the current flows through a portion of the OLED display in response to a series of different common values, the threshold voltage of the aSi-TFTs and resistance of the OLED may be determined. For example, the voltage whose value exceeds the voltage value whose current measurement exceeds the corresponding current measurements by a significant amount may be the threshold voltage. A significant amount may be an amount greater than the average noise level of the measurement or some absolute value, for example 1%, 5%, or 10%. Likewise the slope of the curve corresponding to the current measurements between the threshold voltage and higher input voltages represents the relative resistance of the OLED and its age at a specific time. By using more current measurements at a greater number of input signal levels, a more accurate measurement may be made. The input values of an image signal may then be mapped, for example with a lookup table memory or with an addition and multiplication corresponding to an offset and gain, to the portion of the curve between the threshold voltage and the maximum voltage. For example, if the threshold voltage corresponds to an input signal of 50 and the maximum signal value is 250, then an input signal of zero may be mapped to a signal of 50, an intermediate input signal of 125 may be mapped to 150, while the maximum value of 250 is mapped to the same value. In alternative embodiments of the present invention, the transformation curve may not be linear, for example it may have a logarithmic relationship. Moreover, because the light-emitting efficiency of the OLED materials at a given current decreases over time, a greater driving value may be employed to compensate for this decrease. For example, the maximum input signal value of 250 may be mapped to a compensated signal value of 255.

In one embodiment of the present invention, all of the sub-pixel elements making up a full-color OLED display may be part of the portion. In other embodiments, all of the sub-pixels having a common color may measured together so that separate measurements for each color can be employed to correct each of the color channels in the OLED separately. In a further embodiment, an OLED may employ redundant sub-pixels of varying efficiency, for example a display having a red, green, blue, and white (RGBW) configuration. In this arrangement, the three colors may be measured together and the white separately or, as noted above, each sub-pixel may be measured separately. Moreover, as noted above with respect to measuring input signals that alternate rapidly between high and low values to provide the appearance of a fixed gray signal over time, different color signals may be alternately measured to provide an appearance of a gray screen, for example by first measuring a red portion, then a green portion, then a blue portion, then a white portion at a first common level, then repeating the sequence of color measurements at a second common level, and so forth. If the common values also alternate between high and low values, the appearance of a fixed gray level may be provided. If the values change from a maximum to a minimum in sequence, or vice versa, the effect of a temporal gray scale may be obtained.

Figure 3:
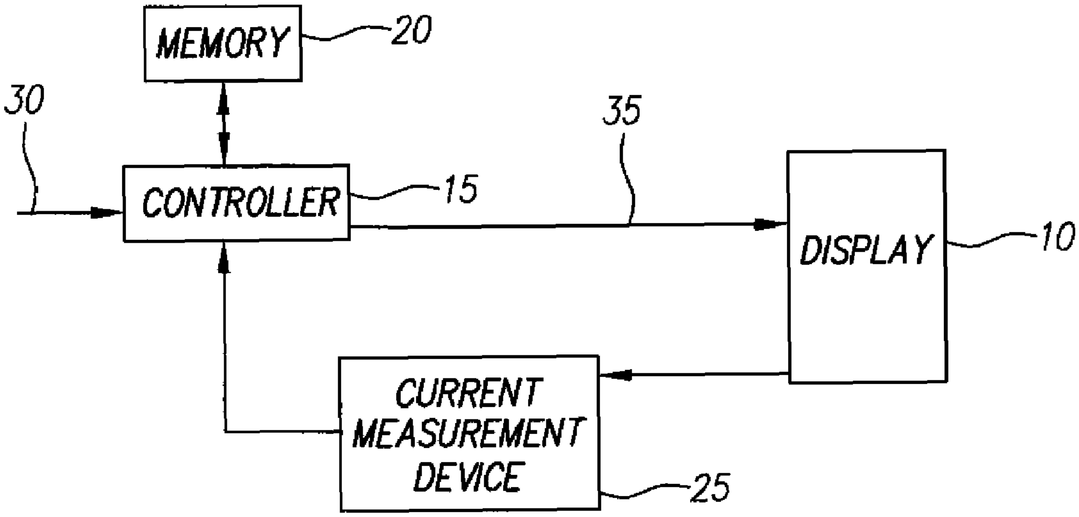
FIG. 3 is a diagram illustrating an OLED system according to an embodiment of the present invention.

The present invention may be employed in display devices and systems. For example, referring to FIG. 3 and according to the present invention, an OLED display system, may comprise an OLED device 10 comprising a plurality of light-emitting elements that change with use; a controller 15 for sequentially displaying an ordered series of calibration images, wherein each of the calibration images have one or more corresponding flat fields, at least one of the corresponding flat fields of each calibration image of the ordered series has a different luminance value, and the calibration images are arranged in the ordered series so as to reduce perceived luminance discontinuities; for measuring and recording current used by the display for each sequentially displayed calibration image; for calculating compensation parameters based on the measured currents; for compensating an input image using the compensation parameters; and for displaying the compensated input image. The controller 15 may include a memory 20 and current measurement apparatus 25. The controller 10 receives input image signals 30, compensates them with data obtained from the current measurement apparatus 25 and stored in memory 20 to produce a compensated signal 35 that is applied to the display device 10.

The present invention may be employed in devices using amorphous silicon thin-film transistors circuits as well as circuits employing low-temperature polysilicon, high-temperature polysilicon, and micro-crystalline silicon. The present invention provides means to characterize the combination of thin-film transistor characteristics and OLED material characteristics over time to provide compensation for such characteristics.

In a preferred embodiment, the present invention is employed in a flat-panel OLED device composed of small molecule or polymeric OLEDs as disclosed in but not limited to U.S. Pat. No. 4,769,292, issued Sep. 6, 1988 to Tang et al., and U.S. Pat. No. 5,061,569, issued Oct. 29, 1991 to VanSlyke et al. Many combinations and variations of organic light-emitting displays can be used to fabricate such a device, including both active- and passive-matrix OLED displays having either a top- or bottom-emitter architecture.

The invention has been described in detail with particular reference to certain preferred embodiments thereof, but it will be understood that variations and modifications can be effected within the spirit and scope of the invention.

PARTS LIST

10 display
15 controller
20 memory
25 current measurement device
30 input image
35 compensated image
100 set luminance value step

105 set image step
110 display image step
115 measure current step
120 test value step
125 increment value step
130 set compensation parameters step
135 input image step
140 compensate image step
145 display image step

What is claimed is:

1. A method of compensating an OLED display device having light-emitting elements that change with use, comprising the steps of:

a) using the device to display images;

b) sequentially displaying an ordered series of flat-field calibration images, wherein each calibration image of the ordered series has a different luminance value, and the calibration images, or the average luminance value of groups of sequential calibration images, are monotonically arranged in the ordered series so as to reduce perceived luminance discontinuities to a user;

c) measuring and recording current used by the display for each sequentially displayed calibration image;

d) calculating compensation parameters based on the measured currents;

e) compensating an input image using the compensation parameters; and f) displaying the compensated input image.

2. The method of claim 1, wherein the display has a number of different luminance values and a first flat-field calibration image in the ordered series has a minimum display luminance value and a second flat-field calibration image in the ordered series has a maximum display luminance value.

3. The method of claim 1, wherein the display has a number of different luminance values and the ordered series includes flat-field calibration images having respective luminance values corresponding to each of the different display luminance values.

4. The method of claim 1, wherein the display has a number of different luminance values and the ordered series includes flat-field calibration images having respective luminance values corresponding to fewer than all of the different display luminance values.

5. The method of claim 1, wherein the display has a number of different luminance values and the ordered series includes a first set of flat-field calibration images displayed at display power-up, and a second distinct set of flat-field calibration images displayed at display power-down, wherein each of the first and second sets of flat-field calibration images includes corresponding flat-field calibration images having respective luminance values corresponding to fewer than all of the different display luminance values.

6. The method of claim 1, wherein the display has a number of different luminance values and the ordered series includes a first set of flat-field calibration images displayed at display power-up, and a second distinct set of flat-field calibration images displayed at display power-down, wherein the first and second sets of flat-field calibration images in combination have flat-field calibration images having luminance values corresponding respectively to each of the different display luminance values.

7. The method of claim 1 wherein the flat-field calibration images are arranged in the ordered series in sequentially-increasing luminance value from smallest to largest, and the ordered series is displayed at display power-up.

8. The method of claim 1 wherein the flat-field calibration images are arranged in the ordered series in sequentially-decreasing luminance value from largest to smallest, and the ordered series is displayed at display power-down.

9. The method of claim 1 wherein the flat-field calibration images are arranged in the ordered series in pairs such that sequentially displayed pairs of flat-field calibration images have combined average luminance values that sequentially increase or decrease.

10. The method of claim 1 wherein the flat-field calibration images are arranged in the ordered series in pairs such that sequentially displayed pairs of flat-field calibration images have a substantially constant combined average luminance value.

11. The method of claim 1 wherein the light-emitting elements comprise differently colored light-emitting elements, and respective ordered series of calibration images are displayed for each of the different colors of light-emitting elements.

12. The method of claim 11 wherein the respective ordered series of calibration images displayed for the different colors of light-emitting elements are arranged to sequentially display flat-fields of each color alternately at common luminance values.

13. The method of claim 1 wherein the device is used to display images at a first frequency, and the flat-field calibration images are displayed at a second frequency different from the first frequency.

14. The method of claim 13 wherein the second frequency is greater than the first frequency.

* * * * *